Patented Sept. 14, 1926.

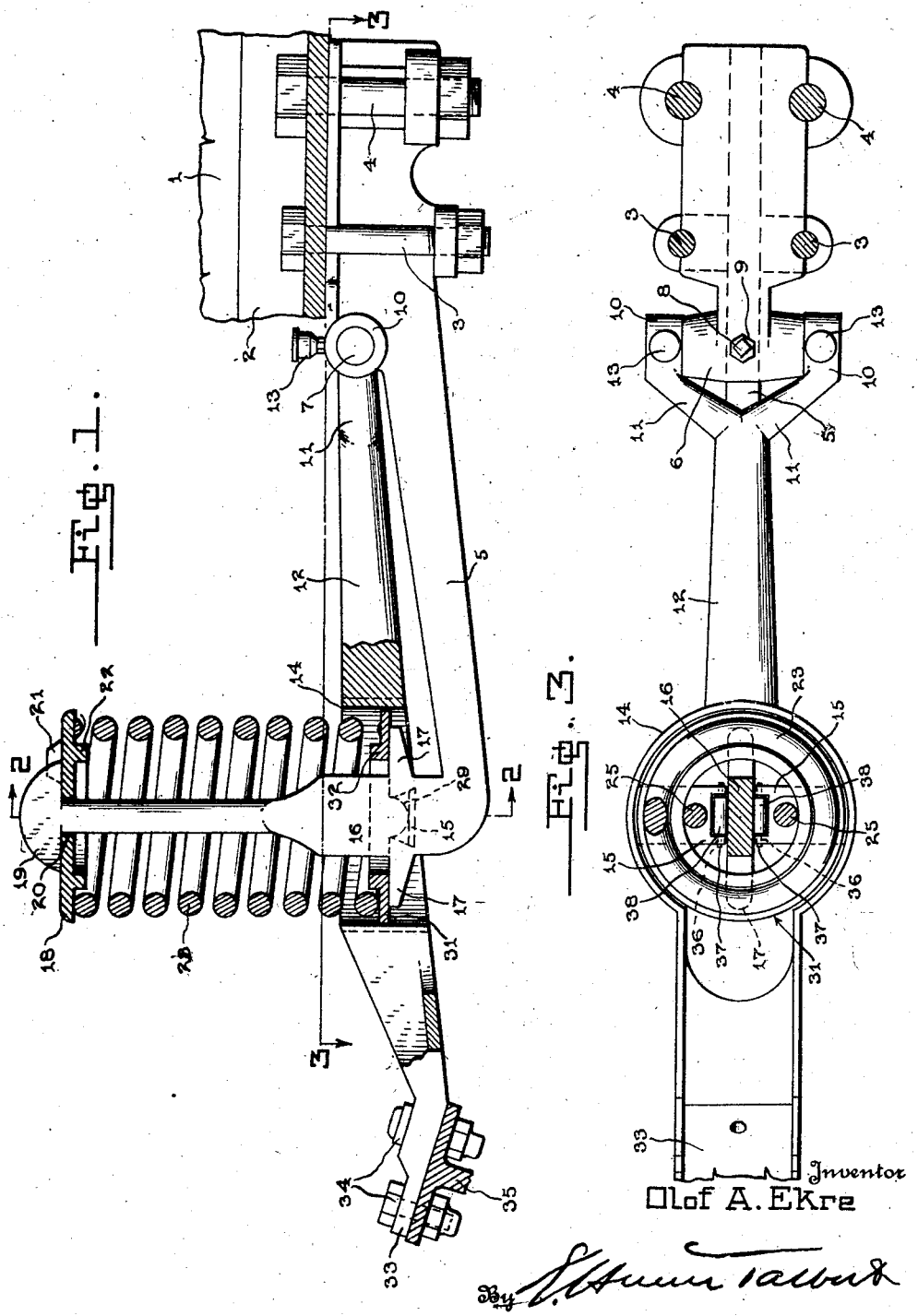

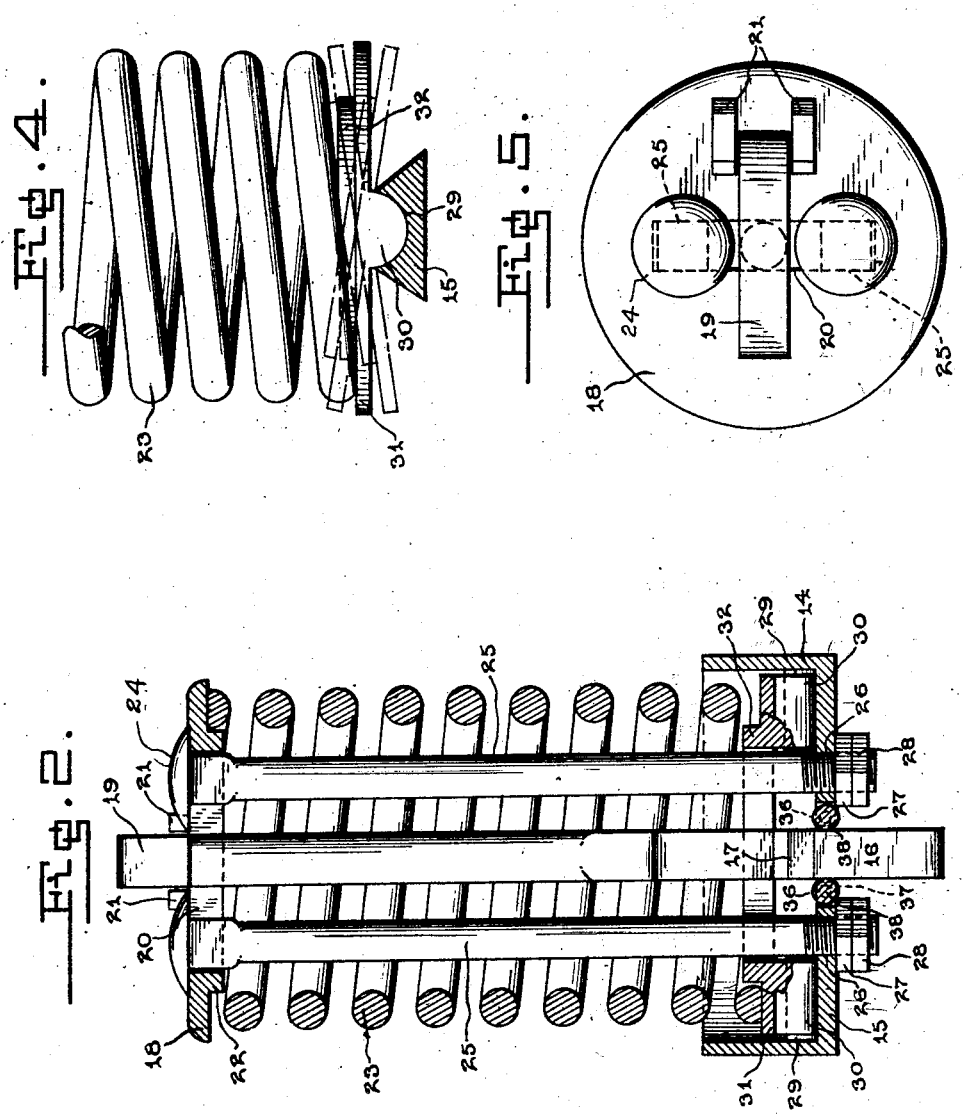

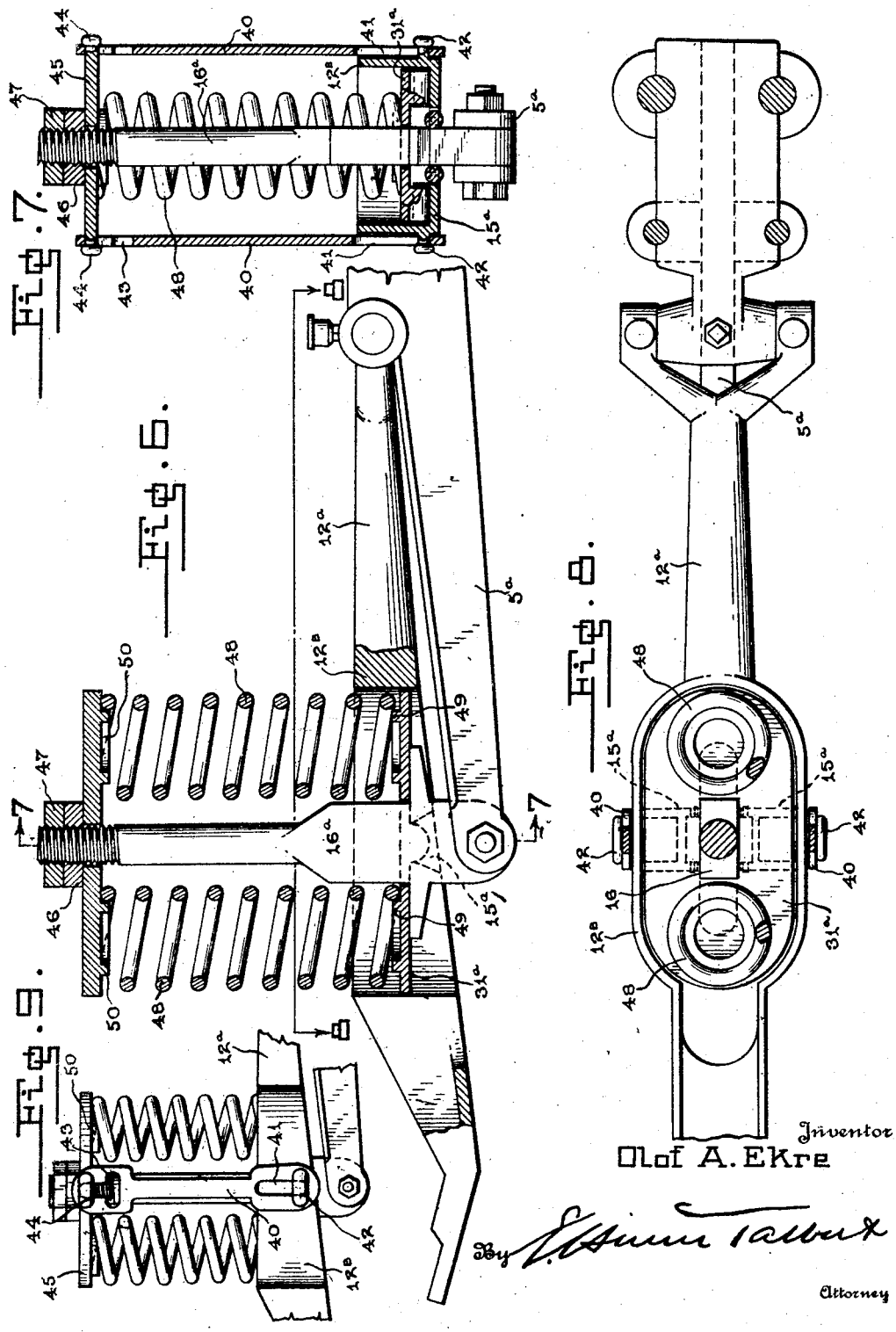

1,600,101

UNITED STATES PATENT OFFICE.

OLOF A. EKRE, OF KINDRED, NORTH DAKOTA.

SPRING AND MOUNTING FOR VEHICLES.

Application filed July 22, 1925. Serial No. 45,228.

It is the purpose of the present invention to provide a spring and mounting for vehicles, preferably of the motor-driven type, and of a construction of such character as will dispense with the well known elliptical type of spring.

Another purpose is to provide, in a construction of spring and mounting therefor, an arrangement such as will alleviate to a substantial degree lateral vibration which is present in the elliptical type of spring and yet permit the body of the vehicle to yield more freely than with an elliptical spring and yet support the body substantially and at the same time have a tendency to absorb the shocks.

Still another purpose is to provide, in a spring and mounting therefor, a link connection between the body of the vehicle and the axle, and an arm on the frame or body with resilient connection between the arm and the link, the resilient connection including a compression coil spring of a type which is yieldably sensitive and yet substantial in its supporting action for the body of the vehicle and at the same time tends to absorb the shocks.

A further purpose is to provide means in the resilient connection for accommodating the inequalities between the arm and the link, also including anti-frictional means to permit certain members of the connection to freely move.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in elevation of a portion of an automobile body and an axle, showing the improved spring and its mounting applied, with parts thereof in section to more clearly illustrate the mounting.

Figure 2 is a sectional view on line 2—2 of Figure 1.

Figure 3 is a sectional view on line 3—3 of Figure 1.

Figures 4 and 5 are detail views of members of the mounting.

Figure 6 is a view of a portion of an automobile body and an axle in elevation, showing the spring and mounting therefor as applied and with parts thereof in section.

Figure 7 is a vertical sectional view on line 7—7 of Figure 6.

Figure 8 is a sectional view on line 8—8 of Figure 6.

Figure 9 is a fragmentary side elevation of the mounting.

Referring to the drawings, especially Figures 1 to 5, inclusive, 1 designates a portion of an automobile chassis with a portion of body mounted thereon, and 2 denotes a bracket fastened to the chassis in any well known manner, and secured to the bracket by bolts 3 and 4 is an arm 5. This arm has a cylindrical bearing 6 with a shaft 7 secured therein by a set-bolt 8 including a lock nut 9 to hold the bolt in place and thereby retain the shaft 7 securely. The shaft projects beyond the bearing and fulcrumed upon the projecting terminals are bearings 10 of the forks or arms 11 of a link 12, there being oil cups 13 carried by the bearings 10 to lubricate the bearings and the projecting terminals of the shaft 7.

The link 12 at a point adjacent its middle portion is provided with a cylindrical ring part 14, and projecting from the interior and diametrically thereof are lugs 15. The legs extend transversely of the ring portion and their adjacent ends are spaced sufficiently to guide an upstanding shank 16 which constitutes an integral part of the arm 5. The base of the shank has projecting lugs 17 and the upper portion of the shank passes through a circular plate 18. The upper end of the shank has a head 19 which is laterally elongated and is positioned above the plate 18.

In order to position the head 19 above the plate and to engage its upper face, the plate has a transverse slot 20 of a length and width sufficient to receive the head 19 and after the plate has been moved so that it may position at a point below the head, a quarter turn is imparted to the plate, so that the head may be positioned transversely of and at right angles to the slot. The upper face of the plate has a pair of upwardly projecting spaced lugs 21 between which one end of the head 19 engages to prevent turning of the plate, the under face of which has an annular rib 22 with which a compression coil spring 23 engages. The annular rib keeps the plate and the upper end of the spring relatively centered with regard to each other.

Passing down through the plate 18, so that their heads 24 may engage with the upper surface of the plate, are bolts 25 which pass through openings 26 in the diametrical lugs 15 of the ring portion of the link. The lower ends of the bolts have retaining and lock nuts 27 and 28 which are located below the lugs 15. The lugs 15 have semicircular sockets or bearings 29 with which similarly shaped projections 30 (which are carried by a ring plate 31) rockably engage, that is, as long as the ring plate is out of engagement with the lugs 17 at the base of the shank.

The lower end of the compression coil spring 23 engages with the rocking ring plate 31, the annular rib 32 on the plate 31 acting to retain the coil spring and the ring plate relatively centered with respect to each other. The ring plate is housed or located in the ring portion of the link of which its terminal part 33 is fastened by bolts or the like 34 to the axle 35 of the motor vehicle.

A movement of the body of the vehicle downward will permit the link to rock, the arm 5 will move below the link, and the shank 16 will pull down on the compression spring 23, the shank being guided between the rollers on the spaced ends of the lugs 15.

Mounted in sockets 36 of the adjacent ends of the lugs 15 and on pins 37 are anti-frictional rollers 38 which bear against opposite sides of the shank 16, enabling the latter to move freely when the arm 5 moves downward or when the link 12 tilts. In case the wheels of the vehicle strike a protrusion in the road-bed, the axle will move up, hence the link 12 will tilt and compress the coil spring, and the lugs 17 on the arm will disengage from the rocking ring plate, and owing to the change in the angular position of the link 12 relative to the shank 16, the rocking ring plate will rock in the bearings 29 and enable the ring plate to accommodate itself more freely and according to the load on the spring 23.

In Figures 6, 7 and 8, the principle is the same as in the other figures, but the construction is somewhat modified. Instead of the link 12$^a$ having a ring portion, its corresponding part is elongated and designated by the numeral 12$^b$ and the plate 31$^a$ is correspondingly shaped to fit the portion 12$^b$. This portion has the inwardly projecting diametrical lugs 15$^a$ having bearings similar to the bearings 29 and also carrying anti-frictional rollers similar to the rollers 38.

Also in this modified construction, the shank 16$^a$ is pivoted to the arm 5$^a$, and in lieu of the bolts 25 as in the other figures, links 40 are substituted in place of bolts. These links 40 have elongated slots 41 at their lower ends and which engage the headed lugs 42 projecting from the sides of the elongated portion 12$^b$ of the link 12$^a$. The upper ends of the links 40 have T-shaped slots 43 which engage the headed lugs 44 of a plate 45 which is in substitution of the plate 18. The plate 45 takes the general shape of the elongated portion 12$^b$ of the link.

The shank 16$^a$ passes through the plate 45 and its upper end is threaded for the reception of retaining and lock nuts 46 and 47 which hold the plate 45 against the upper ends of the springs 48 and are adjustable to give more tension on the springs if necessary. There are two springs 48, one upon either side of the shank 16$^a$, and where they engage with the plates 31$^a$ and 45, they cooperate respectively with annular ribs 49 and 50 which constitute integral parts of said plates, the annular ribs acting to centralize the springs and retain them in position. The action of this modified spring and mounting is the same as in Figures 1 to 5, inclusive.

The bolts 25 are for the purpose of holding the plate 18 from moving up when on the rebound and the T-shaped links 40 in Figures 6, 7, 8 and 9 are for the same purpose. The lugs 17 will lift up on the rocking ring plate when it rebounds, there being a movement of about three-quarters of an inch from the arm and the slots 41 in the links 40 permit of such movement to correspond with the movement permitted in the structure shown in Figures 1, 2 and 3. The bolts 25 pass through the cap plate 18 and down through a portion of the link 12$^a$, there being nuts and lock nuts on their lower ends to hold the parts in position.

The upper end of the shank 16 has a head 19 which engages with the cap plate 18$^a$ when it rebounds to at least three-quarters of an inch according to the irregularities in the road. The cap plate 18 will remain in the same position but the springs will compress while the ring plate at the bottom will leave its seat when it rebounds and lift up according to the compression of the springs.

The invention having been set forth, what is claimed is:

1. A spring and mounting therefor for vehicles which include a chassis and a wheel supporting axle, a link fixed to the axle and in turn pivoted to the chassis, a supporting arm carried by the chassis and having an upstanding member guided through the link and anti-frictional means to insure freedom of movement of the member, a rocking device operatively supported on the link, and yieldable means operatively connecting between one end of the member and the rocking device for resiliently supporting the chassis and the body mounted thereon.

2. In combination with a chassis including a body and a wheel supporting axle, of a link fixed to the axle and in turn pivoted to the chassis and provided with opposite guides, an arm fixed to the chassis and provided with a right angle extension engaging between the guides, an abutment carried by the upper end of the extension, a device rockably carried by the link, and resilient means interposed between the abutment and the device for resiliently supporting the chassis and its body.

3. The combination with a chassis including a body and a wheel supporting axle, a link fixed to the axle and in turn pivoted to the chassis, a member guided through the link and operatively supported on the chassis, an abutment on the upper end of the member with means to prevent revoluble displacement of the abutment, a device rockably supported on the link, and resilient means interposed between the abutment and the device for resiliently supporting the chassis and its body.

4. The combination with a chassis including a body and a wheel supporting axle, a link fixed to the axle and in turn pivoted to the chassis, a member guided through the link and operatively supported on the chassis, an abutment on the upper end of the member with means to prevent revoluble displacement of the abutment, a device rockably supported on the link, resilient means interposed between the abutment and the device for resiliently supporting the chassis and its body, and means operatively connected to the abutment and in turn cooperating with the link to guide the device relative to the link.

5. The combination with a chassis including a body and a wheel supporting axle, of a link fixed to the axle and in turn pivoted to the chassis, opposed guides carried by the link, a member engaging between the guides and being operatively supported on the chassis, an abutment operatively connected with the upper end of the member, a device rockably supported by the link, resilient means interposed between the device and the abutment, and a pair of elements operatively connecting the abutment and the link for permitting the link to operate toward and from the abutment as the resilient means is put under action.

6. The combination with a vehicle chassis and a body supported thereon and a wheel supporting axle, of a link fixed to the axle and in turn pivoted to the chassis, a member guided through the link with an abutment at its upper end, a rockable device operatively supported on the link, resilient means interposed between the device and the abutment, and opposed links operatively connecting the abutment and the pivoted link, thereby guiding the pivoted link relative to the abutment and limiting the same in its movement in one direction.

7. In combination with a vehicle chassis and a body supported thereon and a wheel supporting axle, of a link fixed to the axle and in turn pivoted to the chassis, a member operatively guided through the link with abutment means at its upper end, a rockable device operatively supported on the link and having opposite lugs, the link having a circular portion in which the rockable device is located and supported on the lugs and adapted to rock according to the load and the pressure on the resilient means, resilient means interposed between the device and the abutment, and means operatively connecting the abutment and pivoted link, thereby guiding the pivoted link relative to the abutment and limiting the same in its movement in one direction.

In testimony whereof he affixes his signature.

OLOF A. EKRE.